United States Patent
Nguyen et al.

(10) Patent No.: US 10,308,816 B2
(45) Date of Patent: Jun. 4, 2019

(54) COATINGS FOR PELLETIZED THERMOPLASTIC PAVEMENT MARKING COMPOSITIONS

(71) Applicants: Potters Industries, LLC, Wilmington, DE (US); Southern Synergy, LLC, LaPlace, LA (US)

(72) Inventors: Lam Thanh Nguyen, Harvey, LA (US); Daniel John Puffer, Sr., Madisonville, LA (US); Suruliappa Jeganathan, Chadds Ford, PA (US); Mark Terry, Madison, MS (US)

(73) Assignees: Potters Industries, LLC, Wilmington, DE (US); Lam Thanh Nguyen, Harvey, LA (US); Daniel John Puffer, Madisonville, LA (US)

( * ) Notice: Subject to any disclaimer, the term of this patent is extended or adjusted under 35 U.S.C. 154(b) by 0 days.

(21) Appl. No.: 15/440,475

(22) Filed: Feb. 23, 2017

(65) Prior Publication Data

US 2017/0158866 A1     Jun. 8, 2017

Related U.S. Application Data

(63) Continuation-in-part of application No. 14/339,023, filed on Jul. 23, 2014, now Pat. No. 9,771,492, which is a continuation-in-part of application No. 14/329,462, filed on Jul. 11, 2014, now abandoned, which is a continuation-in-part of application No. 14/270,068, filed on May 5, 2014, now Pat. No. 9,732,480.

(51) Int. Cl.

| | |
|---|---|
| C09D 5/00 | (2006.01) |
| C09D 5/33 | (2006.01) |
| C09D 201/04 | (2006.01) |
| E01F 9/506 | (2016.01) |
| C09D 191/06 | (2006.01) |
| C09D 193/04 | (2006.01) |
| C09D 7/65 | (2018.01) |
| C09D 7/40 | (2018.01) |
| C09D 7/61 | (2018.01) |
| C09D 7/63 | (2018.01) |
| C08K 3/36 | (2006.01) |

(52) U.S. Cl.
CPC ............. *C09D 5/004* (2013.01); *C09D 7/40* (2018.01); *C09D 7/61* (2018.01); *C09D 7/63* (2018.01); *C09D 7/65* (2018.01); *C09D 191/06* (2013.01); *C09D 193/04* (2013.01); *C09D 201/04* (2013.01); *E01F 9/506* (2016.02); *C08K 3/36* (2013.01)

(58) Field of Classification Search
CPC ............ C09D 5/004; C09D 7/40; C09D 7/61; C09D 7/63; C09D 7/65; C09D 191/06; C09D 193/04; C09D 201/04; E01F 9/506
USPC ......................................................... 523/172
See application file for complete search history.

(56) References Cited

U.S. PATENT DOCUMENTS

| | | |
|---|---|---|
| 3,520,027 A | 7/1970 | Amos et al. |
| 3,867,178 A | 2/1975 | Ritter et al. |
| 4,129,666 A | 12/1978 | Wizerkaniuk |
| 4,521,541 A | 6/1985 | Rutherford et al. |
| 5,267,845 A | 12/1993 | Anderlind et al. |
| 5,472,651 A | 12/1995 | Peterson et al. |
| 5,665,793 A | 9/1997 | Anders |
| 5,861,117 A | 1/1999 | Rosenbaum |
| 5,928,716 A | 7/1999 | Finley |
| 5,972,421 A | 10/1999 | Finley |
| 6,328,798 B1 | 12/2001 | Bostrom et al. |
| 6,552,110 B1 | 4/2003 | Yalvac et al. |
| 7,186,102 B2 | 3/2007 | Laver et al. |
| 7,458,798 B2 | 12/2008 | Weber et al. |
| 7,771,635 B2 | 8/2010 | Boothe et al. |
| 8,303,871 B2 | 11/2012 | Boothe et al. |
| 2003/0183972 A1 | 10/2003 | Weber et al. |
| 2007/0029649 A1 | 2/2007 | Shiffer |
| 2008/0170968 A1 | 7/2008 | Kraus et al. |

(Continued)

FOREIGN PATENT DOCUMENTS

| | | |
|---|---|---|
| GB | 2164762 B | 5/1988 |
| WO | 9738835 A1 | 10/1997 |

(Continued)

OTHER PUBLICATIONS

International Search Report for PCT/US2018/017041 dated Apr. 10, 2018.

(Continued)

*Primary Examiner* — Edward J Cain
(74) *Attorney, Agent, or Firm* — Buchanan Ingersoll & Rooney PC

(57) ABSTRACT

A coating for pelletized thermoplastic road marking material is provided in which at least one of waxes, silica compounds, and inorganic compounds is provided on the surface of the thermoplastic pellet. The pellet is formed by mixing a binder mixture with a filler mixture, heating the mixed ingredients while mixing into a homogenous molten mixture and then extruding the molten mixture. The extruded material is cooled, cut into individual pellets and then coated. The coating prevents clumping of the pellets and also imparts improved flowability and lower melting point properties. Preferred coatings include micronized polyethylene wax, silicates, silanes, silicones, siliconates, fluoropoymers, calcium carbonate and zeolite.

27 Claims, 1 Drawing Sheet

(56) References Cited

U.S. PATENT DOCUMENTS

| | | |
|---|---|---|
| 2009/0181332 A1* | 7/2009 | Ramsden ........... G03C 1/49872 |
| | | 430/619 |
| 2009/0273112 A1 | 11/2009 | Boothe et al. |
| 2011/0123770 A1 | 5/2011 | Greer et al. |
| 2011/0237733 A1* | 9/2011 | Fehervari ............. H04R 31/003 |
| | | 524/494 |
| 2012/0053278 A1 | 3/2012 | Malucelli et al. |
| 2013/0036714 A1 | 2/2013 | Bolton et al. |
| 2013/0161856 A1 | 6/2013 | Panjnani et al. |
| 2014/0147685 A1* | 5/2014 | Hills ................... C09D 133/08 |
| | | 428/447 |
| 2014/0194560 A1* | 7/2014 | Leotsakos ............ C09D 133/08 |
| | | 524/88 |
| 2014/0272331 A1 | 9/2014 | Teng et al. |
| 2016/0376467 A1 | 12/2016 | Puffer, Sr. et al. |

FOREIGN PATENT DOCUMENTS

| | | |
|---|---|---|
| WO | 2009150305 A1 | 12/2009 |
| WO | 2014166693 A1 | 10/2014 |

OTHER PUBLICATIONS

Written Opinion of the International Searching Authority for PCT/US2018/017041 dated Apr. 10, 2018.

* cited by examiner

COATINGS FOR PELLETIZED THERMOPLASTIC PAVEMENT MARKING COMPOSITIONS

CROSS-REFERENCE TO RELATED APPLICATIONS

This application is a continuation-in-part of co-pending application Ser. No. 14/339,023 filed on Jul. 23, 2014, entitled "Thermoplastic Pavement Marking Composition And Method," which is a continuation-in-part of application Ser. No. 14/329,462 filed on Jul. 11, 2014, entitled "Pelletizing System For Thermoplastic Pavement Marking Material," which is a continuation-in-part of application Ser. No. 14/270,068 filed on May 5, 2014, entitled "Pelletizing System For Road Surface Marking Material," the full disclosures of which are incorporated by reference herein and priority of which is hereby claimed.

BACKGROUND OF THE INVENTION

Road surface markings are used on paved roadways to provide guidance and information to drivers and pedestrians. Road surface markings can be formed using mechanical or non-mechanical devices. Mechanical road surface markers may be raised or recessed into the road surface, and can be either reflective or non-reflective. Examples of mechanical markers are Botts' dots and rumble strips. Non-mechanical markers may be formed by paint, thermoplastic, preformed polymer tape, epoxy and other methods.

Thermoplastic markers are some of the most common types of road marking based on their balance between cost and performance longevity. Thermoplastic binder systems are generally based on one of three core chemistries: hydrocarbons, rosin esters, and maleic modified rosin esters (MMRE). Thermoplastic coatings are generally homogeneous dry mixes of binder resins, plasticizers, glass beads (or other optics), pigments, and fillers. These types of markers demonstrate increased durability, lasting 3 to 6 years, and retro-reflectivity.

Thermoplastic pavement markings are used in a hot-melt application process for various types of traffic control indicia. They are normally comprised of alkyd or hydrocarbon based resin systems, although hybrid versions of the materials can be formulated to impart favorable properties of each individual system into one combined system. Typically, thermoplastic pavement marking materials are used on roadways in longitudinal lines as edge and center-lines either as a continuous line or a skipped/dashed line. They can also be used for transverse markings such as stop bars, chevrons, traffic taming markings, bike and pedestrian crossings, railroad crossings, or similar markings. Thermoplastic pavement markings are used on public and private highways, public and private properties, airports, and parking lots.

Thermoplastic pavement are non-reactive coatings systems that are 100% solids materials composed of binder, pigment, glass beads, and inert fillers. Each state, and some cities and counties, govern the type and application of thermoplastic application by specifying the chemical composition and final film properties in terms of field performance over the lifecycle of the marking. Although most governmental agencies have their own internal and independent pavement marking specifications, thermoplastic pavement marking specifications are normally based on some variation of AASHTO M-249, which is a federal specification that sets minimum and basic requirements of the materials to be used. The binder is made up of a combination of rosin or petroleum based resins, plasticizing oils, elastomers, and viscosity and flow modifiers. The pigment for white materials is predominately Type II rutile titanium dioxide. The pigment for yellow materials is an organic based yellow pigment which can be a combination of yellow and red or orange pigments designed to withstand high temperatures and provide excellent UV resistance and weatherability. Glass beads are incorporated into the material so that as the material degrades under UV, water, and traffic exposure the glass beads will become exposed and serve as reflective elements for nighttime visibility while under illumination from vehicles' headlamps. An exemplary compositional range for each component is as follows: binder 18-26%, pigment ($TiO_2$ only) 10-12% for white, N/A for yellow, and beads 30-40%.

Conventional thermoplastic mix is supplied in powdered form, which makes it difficult to load into the road marking machine. The technicians have to strictly follow safety regulations and use special equipment when preparing the marking mix. U.S. Pat. No. 5,972,421 discloses a method for producing pelletized pavement marking mixtures in which each pellet is a homogeneous mixture of the desired thermoplastic composition. More recently, co-pending application Ser. No. 14/329,482 filed on Jul. 11, 2014, discloses a system of producing pelletized thermoplastic pavement marking material, which eliminates or significantly minimizes hazards associated with dust produced by powdered mixes. This application is directed to an apparatus and method of producing the thermoplastic pavement marking material in a pelletized form.

Co-pending application Ser. No. 14/339,023, filed on Jul. 23, 2014, discloses a composition suitable for use as a road marking substance. This composition is formed by mixing a binder mixture with a filler mixture, heating the mixed ingredients while mixing into a homogenous molten mixture and then extruding the molten mixture. The extruded material is cooled, cut into individual pellets, coated with an anti-clumping coating and packaged for use in making a road marking substance in situ. The binder can be alkyd-based or hydrocarbon based. The binder includes rosin resins, wax and a plasticizer, and a hydrocarbon resin is added for the hydrocarbon-based binder. The filler contains titanium dioxide, a pigment (if necessary) and ground calcium carbonate. The pellet coating material can be a member selected from a group containing kaolin clay, calcium carbonate, calcined clay, micronized waxes and other anti-clumping materials or a combination of materials.

SUMMARY OF THE INVENTION

A coating for pelletized thermoplastic road marking material is provided in which at least one of waxes, silica compounds, and inorganic compounds is provided on the surface of the thermoplastic pellet. The pellet is formed by mixing a binder mixture with a filler mixture, heating the mixed ingredients while mixing into a homogenous molten mixture and then extruding the molten mixture. The extruded material is cooled, cut into individual pellets and then coated. The coating prevents clumping of the pellets and also imparts improved flowability and lower melting point properties. Preferred coatings include micronized polyethylene wax, silicates, silanes, silicones, siliconates, fluoropoymers, calcium carbonate and zeolite.

BRIEF DESCRIPTION OF THE DRAWINGS

FIG. 1 is a photograph showing the results of a deformation test performed on a standard thermoplastic material and a thermoplastic material made in accordance with the present invention.

DETAILED DESCRIPTION OF THE PREFERRED EMBODIMENTS

By creating pellets of the pavement marking material, a homogeneous dust-free product is produced that has substantially less dust than conventional dry-blend or powder mixes. The pavement marking composition produced using pelletized materials is homogenized during manufacturing, thereby producing compositionally identical particles. Having particles that are identical allows for increased process control and monitoring. Theoretically, one particle can be tested for composition and physical properties due to the homogenous nature of the finished product. Smaller samples can be taken with greater certainty of testing accuracy.

In co-pending application Ser. No. 14/339,023, a coating is applied to the extruded and dried pellets in a pellet coating barrel or vessel which is mounted below a coating container which houses a pellet coating material. A weight loss load cell can be operationally connected to the coating container in order to regulate delivery of the pellet-coating material to the pellet coating vessel.

The pellet coating process modifies the surface of the pellets so that they will remain free flowing after packaging and storage. The free flowing nature of the material is necessary for ease of use during application. In one embodiment, the pelletized material is deposited into a smooth walled, rotating barrel with an angled axis inclined toward the pellet source. As the material falls into the rotating barrel, the coating agent is metered from the coating container into the barrel at a flow rate controlled by the control unit in the form of the weight loss cell. As an alternative, the pellets can be coated by suspending the pellet coating as solution in the water used to cool and transport the material.

Applicants have found that the coated pellets show improved handling performance beyond their anti-clumping behavior. The coated pellets have a lower melting point than powder mixtures and also exhibit improved flowability properties.

Applicants have found that a new series of coatings that provides improved anti-clumping properties at elevated temperatures Coatings for thermoplastic pellets can be prepared from organic compounds such as waxes, various silica based compounds like silanes, silicones, siliconates and fluoropolymers; or inorganic compounds such as calcium carbonate, silica, or zeolite. Waxes are a group of organic compounds containing long alky chains and not soluble in water. They are derived from animals, plants, petroleum, and synthetic sources. In a first preferred embodiment, the coating for the pellets is an aliphatic hydrocarbon such as micronized polyethylene wax (Polyspherse W2S). In a second preferred embodiment, the coating for the pellets is a silica compound selected from the group of functionalized silanes, such as amino or alkyl silanes; silicones, such as alkyl silicones; or siliconates, such as sodium methlysiliconate. In a third preferred embodiment, the coating for the pellets is a fluoropolymer, such as Capstones brand (DuPont), which can be either cationic or anionic. In a fourth preferred embodiment, the coating for the pellets is an inorganic compound such as silica, calcium carbonate, sodium silicate or a zeolite. Preferred silica compounds include nano silica solutions, silica emulsions, and sodium silicate. Small particle size zeolite powder is preferred. Examples of additional coating compounds that can be used are polyethylene wax (Polyspherse W2F), amino silane (DC Z-6011), silicone emulsion, siliconate (sodium methyl silconate DC-772), nano silica (Ludox AS-30), sodium silicate, and zeolite powder (PQ corporation CBV760).

In addition to preventing the pellets from clumping, it has been found that the presently preferred coatings improve the performance of the road marking. When melted with the rest of the pellet prior to application on the roadway, the coating will enhance the ability of the marking to resist deformation under the pressure of vehicular traffic. This allows the roadway marking to remain true and not spread out or otherwise smear. The preferred polyethylene wax coating will also lower the melt temperature of the pellet, reducing the energy needs to melt the pellets and also allowing the marking application system to operate at a lower, safer temperature. The polyethylene wax coating also improves the flowability of the melted pellets, thereby allowing the road markings to be applied at a quicker rate.

Experiment 1

Melting Point Comparison.

The following data presented in Table 1 shows that the pelletized thermoplastic described in this invention has a lower melt temperature compared to conventional powder thermoplastics. In a metal can, 100 grams of each thermoplastic product was heated on a hot plate and the temperature was measured when the product melted and was easily stirred by a spatula.

TABLE 1

| Products | Melting point (° F.) |
|---|---|
| Powder thermo (Ennis Flint) | 334 |
| Pelletized thermo PE wax coated | 268 |
| Pelletized thermo $CaCO_3$ coated | 273 |

Experiment 2

Melt Flow Properties.

One hundred grams of thermoplastic product was placed in a metal can and heated on a hot plate until it melted and became a viscous fluid. The can was then placed at a 45° angle and the contents were allowed to flow and captured in another container placed below. The weight of the material that flowed into the second can was determined and a flow rate was calculated for the thermoplastic product. Thermoplastic products having a higher flow rate were more easily able to flow out of the thermoplastic tank.

TABLE 2

| Products | Flow rate (%) |
|---|---|
| Powder thermo (Ennis Flint) | 45.2 |
| Pelletized thermo PE wax coated | 59.3 |
| Pelletized thermo $CaCO_3$ coated | 54.1 |

Experiment 3

Anti-Clumping Properties.

Most thermoplastic materials are stored in a closed, metal tank for a period of time before lane striping. Depending on the ambient temperature, the inside temperature of the tank will be significantly higher than the ambient temperature. Under such conditions, the thermoplastic material is susceptible to clumping and becomes difficult to transfer to the container on the truck. The following experiment was carried out to determine the effect of temperature. The pelletized thermoplastic product with polyethylene wax was washed with hexane/toluene followed by acetone to remove all surface coatings. The pelletized thermoplastic material with calcium carbonate was washed with 0.5N hydrochloric acid followed by water then air dried. Each thermoplastic pellet sample (50 grams) was placed in a glass beaker and placed in an oven at 150° F. (65.6° C.) and the product was observed for clumping. After heating for 45 minutes at 150° F., the samples without coating clumped heavily and formed a thick mass, but the pellets with coatings remained as pellets without sticking and were able to be poured out of the beaker. The same trend was also observed after heating for 2 hours at 150° F. The results of this experiment are presented in Table 3 below.

TABLE 3

| Products | Physical form after 45 min at 150° F. |
|---|---|
| Pelletized thermo PE wax coated | Pellets easy flow |
| Pelletized thermo without PE wax coating | Clumped to thick mass |
| Pelletized thermo CaCO₃ coated | Pellets easy flow |
| Pelletized thermo without CaCO₃ coating | Clumped to thick mass |

Experiment 4

Additional Anti-Clumping Coatings.

A one liter metal container was placed in a rotating tumbler and 100 grams of uncoated thermoplastic pellets were added. A series of coating compositions set forth in Table 4 below were prepared (about 30% of active chemical in water) and 4 g of these solutions were added to the pellets while rotating, and rotated further for 5 minutes. In the case of zeolite powder, 3 grams of water was first sprayed onto the pellets and 2 grams of the powder was added slowly white rotating. The coated thermoplastic pellets (50 grams) were placed an 80 mL glass beaker and heated in an oven at 140° F. (60° C.), 160° F. (71.1° C.), and 180° F. (82.2° C.) for the specified time and the glass beaker was taken out and the contents were poured out and observed for any clumping. The results are summarized below in Table 4. All coating chemicals mentioned in Table 4 show better anti-clumping effect than PE wax up to 160° F.

TABLE 4

| Coating chemicals on pellets | After 1 h at 140° F. | After 2 h at 140° F. | After 2 h at 160° F. | After 2 h at 180° F. |
|---|---|---|---|---|
| No chemical (uncoated) | Clumped | Clumped | Clumped | Clumped |
| PE wax | No clumping | Clumped | Clumped | Clumped |
| Silicone emulsion | No clumping | No clumping | No clumping | Clumped |
| Nano silica | No clumping | No clumping | No clumping | Clumped |
| Capstone FS-63 | No clumping | No clumping | No clumping | Clumped |
| Sodium methyl siliconate | No clumping | No clumping | No clumping | Clumped |
| Amino silane | No clumping | No clumping | No clumping | Clumped |
| Sodium silicate | No clumping | No clumping | No clumping | No clumping |
| Zeolite powder | No clumping | No clumping | No clumping | No clumping |

Experiment 5

The PE Wax coating/PE Wax in the material formulation also imparts to the thermoplastic pellets the ability to resist deformation at low temperatures. This property is important for pelletized thermoplastic because if the pellets deform during storage, they will form a physical "bridge" that will prevent them from flowing readily during use.

In an aluminum can or similar container, 500 grams of thermoplastic material was melted in an oven at 400° F. (204.4° C.) for 4 hours. The can containing the molten material was removed from the oven and the contents were stirred for 5 seconds with a suitable long blade spatula. Approximately 50-200 grams of the molten material was poured onto a non-stick surface to form a thin, circular disc of molten material. The disc should be less than ½ inch thick having a diameter of 2-3 inches. After the disc was cooled to room temperature, the disc was suspended over a 2 inch crevasse in an incubator oven at 115° F. (46.1° C.). After 48 hours, the samples were monitored for deformation.

The results of this experiment are shown in FIG. 1. A standard thermoplastic pellet (labeled 9902 in FIG. 1) showed notable deformation. In contrast, the wax coated/containing thermoplastic pellet showed no movement.

Although Experiment 5 was conducted using polyethylene wax, it is expected that the same resistance to thermal deformation would likewise occur if the coating were formed using any of the compositions set forth in Table 4.

In addition, the coatings listed above can be combined with one another and used in combination. For example, a coating can be formed using sodium silicate combined with amino silane or a silicone emulsion. Likewise, nano silica can be combined with amino silane or a silicone emulsion to form a coating. An additional coating can be formed by combining sodium methyl siliconate with nano silica or sodium silicate. Furthermore, a coating can be formed by combining amino silane or sodium silicate or nano silica with glass dust having an average size between 5 and 70 microns.

The pellets produced in accordance with the present invention have superior storage stability. The pellets or particles are in the same physical form that is placed on the highway as an exterior, UV and weather resistant coating. Therefore, the pellets can withstand exposure to moisture, heat, humidity for longer periods than the current products on the market. Conventional "dry blend" products are produced in a powder form that will absorb moisture and become a solid compressed block over a long storage time. Moisture content causes increased energy to vaporize the moisture and the increased energy and heat will also cause color and physical property degradation. When the material becomes compressed the melt time, energy consumed, and labor requirement is greatly increased. "Block" material can withstand moisture as well, but the boxes that it is packaged in can get wet and become a nuisance and efficiency killer for crews. Generally, thermoplastic is considered to have a one-year storage life when stored indoors, away from direct contact with water. The pellet materials produced according to this invention could see that longevity at least doubled.

It is envisioned that the pellets can be used in conventional melt vessels and application operations, as well as "tankless" application operations. In a "tankless" process, no material would be heated in melt vessels or kettles. The pellets or particles would be added manually, pneumatically, or by other automatic or semi-automatic conveyance to a system of pipes and extruders capable of heating the material "on demand" and without any preheating.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

We claim:

1. A road marking composition comprising a binder mixture comprising one or more members selected from the group consisting of rosin resins, waxes, and plasticizers, a filler mixture including reflective elements, and a C5 aliphatic hydrocarbon resin comprised of one or more components of the group consisting of trans-1,3-pentadiene, cis-1,3-pentadiene, 2-methyl-2-butene, dicyclopentadiene, cyclopentadiene, and cyclopentene, said road marking composition formed into pellets having a coating comprising at least one of waxes, silica compounds, and inorganic compounds, wherein the rosin resins are comprised of modified rosin resins and rosin esters.

2. The composition of claim 1, wherein said coating is a micronized polyethylene wax.

3. The composition of claim 1, wherein said coating is one of a silicate, functionalized silane, silicone, and siliconate.

4. The composition of claim 3, wherein the coating is one of a group of amino or alkyl silanes, alkyl silicones and sodium methlysiliconate.

5. The composition of claim 1, wherein said coating is a fluoropolymer.

6. The composition of claim 5, wherein said fluoropolymer is a cationic fluoropolymer.

7. The composition of claim 5, wherein said fluoropolymer is an anionic fluoropolymer.

8. The composition of claim 1, wherein said coating is one of a calcium carbonate and a zeolite.

9. The composition of claim 1, wherein the silica compound is one of a nano silica solution, silica emulsion, and sodium silicate.

10. A road marking composition comprising a binder mixture comprising one or more members selected from the group consisting of rosin resins, waxes, plasticizers, and a filler mixture including reflective elements, said road marking composition formed into pellets having a coating comprising at least one of waxes, silica compounds, and inorganic compounds, wherein the rosin resins are comprised of modified rosin resins and rosin esters, and wherein the road marking composition is melted, cooled to a temperature of between 93° C. and 148° C., extruded and cut into individual solid pellets.

11. The composition of claim 10, wherein said coating is a micronized polyethylene wax.

12. The composition of claim 10, wherein said coating is one of a silicate, functionalized silane, silicone, and siliconate.

13. The composition of claim 12, wherein the coating is one of a group of amino or alkyl silanes, alkyl silicones and sodium methlysiliconate.

14. The composition of claim 10, wherein said coating is a fluoropolymer.

15. The composition of claim 14, wherein said fluoropolymer is a cationic fluoropolymer.

16. The composition of claim 14, wherein said fluoropolymer is an anionic fluoropolymer.

17. The composition of claim 10, wherein said coating is one of a calcium carbonate and a zeolite.

18. The composition of claim 10, wherein the silica compound is one of a nano silica solution, silica emulsion, and sodium silicate.

19. A road marking composition comprising a binder mixture comprising one or more members selected from the group consisting of rosin resins, waxes, plasticizers, and a filler mixture comprising reflective elements, said road marking composition formed into pellets having a coating comprising at least one of waxes, silica compounds, and inorganic compounds.

20. The composition of claim 19, wherein said coating is a micronized polyethylene wax.

21. The composition of claim 19, wherein said coating is one of a silicate, functionalized silane, silicone, and siliconate.

22. The composition of claim 21, wherein the coating is one of a group of amino or alkyl silanes, alkyl silicones and sodium methlysiliconate.

23. The composition of claim 19, wherein said coating is a fluoropolymer.

24. The composition of claim 23, wherein said fluoropolymer is a cationic fluoropolymer.

25. The composition of claim 23, wherein said fluoropolymer is an anionic fluoropolymer.

26. The composition of claim 19, wherein said coating is one of a calcium carbonate and a zeolite.

27. The composition of claim 19, wherein the silica compound is one of a nano silica solution, silica emulsion, and sodium silicate.

* * * * *